US005866997A

United States Patent [19]

Sorsa et al.

[11] Patent Number: 5,866,997

[45] Date of Patent: Feb. 2, 1999

[54] SYSTEM FOR DIRECTING AN APPARATUS SUCH AS A CRANE BRIDGE MOVING ON WHEELS ALONG RAILS

[75] Inventors: Timo Sorsa, Jokela; Matti Kemppainen; Ari Lehtinen, both of Hyvinkää, all of Finland

[73] Assignee: KCI Konecranes International Corporation, Hyvinkää , Finland

[21] Appl. No.: 917,459

[22] Filed: Aug. 26, 1997

[30] Foreign Application Priority Data

Sep. 13, 1996 [FI] Finland .................................... 963639

[51] Int. Cl.[6] ....................................................... H02P 5/46

[52] U.S. Cl. ................................ 318/66; 318/34; 318/70; 318/3

[58] Field of Search ................................ 318/66, 34, 70, 318/3

[56] References Cited

U.S. PATENT DOCUMENTS 5,319,292 6/1994 Backstrand .................................. 318/3

FOREIGN PATENT DOCUMENTS 2528293 1/1977 Germany .
2835688 2/1980 Germany .
2112548 7/1983 United Kingdom .

*Primary Examiner*—Karen Masih

[57] ABSTRACT

The invention relates to a system for directing an apparatus, such as a crane bridge (1), moving on wheels along rails, which apparatus comprises a specified drive arrangement ($m_1$, $m_2$, $m_3$, $m_4$; $k_1$, $k_2$) on both sides of a roadway defined by rails (3), and which system comprises in the apparatus at least on one side of the roadway at least two successive detectors ($d_1$, $d_2$) in the direction of the rail (3) for measuring a lateral distance ($l_1$, $l_2$) of a specific part of an edge ($e_1$, $e_2$) of the apparatus to be driven from the rail, a control loop (CS) guiding the drive arrangements, a controller of the loop being able to direct the distance measurements ($l_1$, $l_2$) of the detectors ($d_1$, $d_2$) to desired values so that the apparatus to be driven will move straight, and an outer control loop (CU) whose controller is able to direct the reference value of the controller of the inner control loop in such a manner that the average of the distance measurements ($l_1$, $l_2$) provided by the detectors ($d_1$, $d_2$) reaches the desired reference value so that the wheels (2) of the apparatus to be driven will move in the middle of the rails (3).

16 Claims, 2 Drawing Sheets

SYSTEM FOR DIRECTING AN APPARATUS SUCH AS A CRANE BRIDGE MOVING ON WHEELS ALONG RAILS

BACKGROUND OF THE INVENTION

1. Field of the Invention

The present invention relates to a system for directing an apparatus, such as a crane bridge, which moves on wheels along rails.

2. Description of the Related Art

In a situation where apparatuses, such as crane bridges which are elongated in the transverse direction with respect to rails, are driven along the rails at a distance from one another, the wheels of the apparatus to be driven are maintained in the middle of the rails by means of mechanical guide rollers. The guide rollers provide some freedom of action so that the mechanical elasticity and deflections of the apparatus to be driven will be managed. However, for cranes, in particular, where the span length of the bridge is long and the driving speed is high, the wear of mechanical guide rollers or other such structural parts is a significant problem.

When bridge driving is accomplished with two or more motor drives with a precise speed control, it is often necessary to compensate the speeds specifically for each motor drive because there are generally many differences in the speed directions and the actual speed of the drives such that the crane bridge tends to be driven aslant. The speed differences between the ends of the bridge are due to both mechanical factors (e.g. differences in wheel dimensions because of wear, for example) and electrical factors (small differences in speed directions because of component tolerances and signal routes, for example).

These problems are attempted to be solved by the control systems for even driving a crane bridge disclosed in references GB-A-2 112 548, DE-A-25 28 293 and DE-A-28 35 688, for example, where the distance of the end of the bridge from the rail is measured with two separate detectors. The controller directs the difference of the distance measurement of the detectors to a desired value in such a manner that the crane bridge will move straight.

However, the controllers of the prior art control systems will still typically be driven on guide rollers, either inside or outside the bridge and are not able to drive the ends of the crane bridge along a desired truck.

BRIEF SUMMARY OF THE INVENTION

One of the objects of the present invention is to remove the disadvantage mentioned above and thus eliminate the mechanical wear of an apparatus driven on rails.

The objects of the present invention will be attained by providing a system for directing an apparatus, such as a crane bridge, moving on wheels along rails, which apparatus comprises a specified drive arrangement on both sides of a roadway defined by rails, and which system comprises in the apparatus at least on one side of the roadway at least two successive detectors in the direction of the rail for measuring a lateral distance of a specific part of an edge of the apparatus to be driven from the rail, and a control loop guiding the drive arrangements, a controller of the loop being able to direct the distance measurements of the detectors to desired values so that the apparatus to be driven will move straight.

Further, the objects of the present invention will be attained with a control system of the invention that also comprises a second, outer control loop whose controller is able to direct the reference value of the controller of an inner control loop in such a manner that the average of the distance measurements provided by the detectors reaches the desired reference value so that the wheels of the apparatus to be driven will move in the middle of the rails.

One of the basic ideas of the present invention is thus to supplement the control system inner loop by an outer control loop whose controller attempts to direct and turn the apparatus to be driven in such a manner that its ends, i.e. wheels, will always move in the middle of the rail. Therefore, the above-mentioned mechanical wear, which is completely unnecessary but significant, can be stopped altogether.

BRIEF DESCRIPTION OF THE DRAWINGS

Hereinafter, the invention will be explained in more detail in connection with crane bridge driving with reference to the appended drawings which are given by way of illustration only, and thus are not limitative of the present invention, in which.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
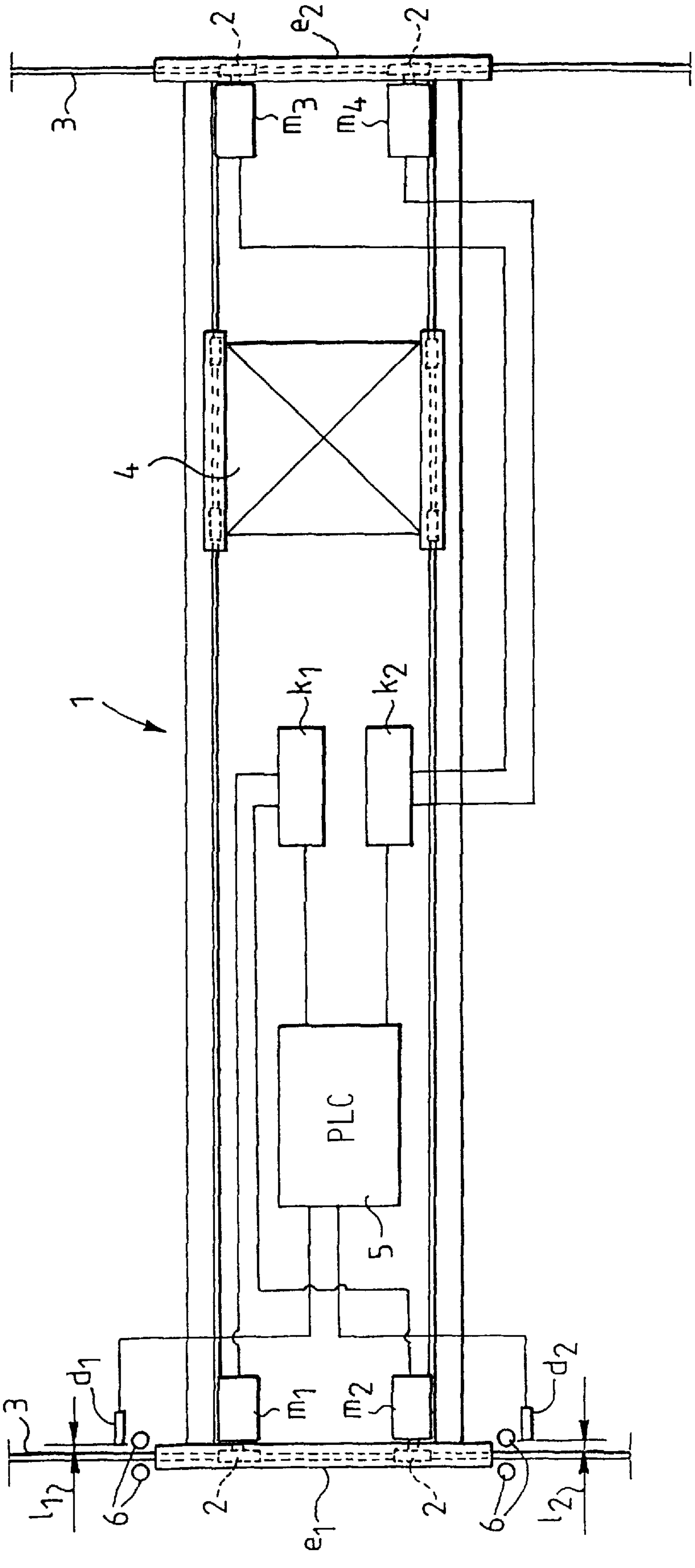
FIG. 1 shows the basic structure of a crane bridge and components used in driving it.

FIG. 1 shows an upper view of a crane bridge 1 which can be moved on wheels 2 along two rectilinear rails 3 situated at a distance from one another. A trolley to be moved in the transverse direction along the bridge 1 is indicated with reference 4. In this example, there are each time at ends $e_1$ and $e_2$ of the bridge 1 two wheels (or two bogies) 2 to both of which a specific motor $m_1$, $m_2$, $m_3$ and $m_4$ has been arranged. That is, there are two motors at both ends $e_1$ and $e_2$ of the bridge 1. Specified speed-controlled motor drives $k_1$ and $k_2$ have been arranged for the motors $m_1$, $m_2$, $m_3$ and $m_4$ of both ends $e_1$ and $e_2$. The motors $m_1$, $m_2$, $m_3$ and $m_4$ and the motor drives $k_1$, and $k_2$ form in this way specified drive arrangements on both sides of the roadway defined by the rails 3. The span length of the bridge 1 in cranes of this type is generally considerably great. That is, the rails 3 are situated at a distance from one another and thus the distance between the rails of the bridge is considerably greater than the “wheel base” of the bridge. As such, the bridge tends to be driven aslant easily if the speed directions of the motor drives $k_1$, and $k_2$ are not suitably corrected. For this reason, a correction unit 5, typically a PLC (Programmable Logic Controller), is arranged, which in this example controls the motor drives $k_1$ and $k_2$ on the basis of the measurement results of detectors $d_1$ and $d_2$ arranged to the front and rear sides of one end of the bridge 1. These measurement results represent the lateral distance of a specific part (that is, the location of the detector) of the end of the bridge 1 from the rail 3 in order to inform directly, for example, to what extent the middle line of the wheel 2 is apart from the middle line of the rail 3. Reference 6 indicates guide roller pairs in the front and rear side of the end of the bridge, ensuring that the bridge 1 will remain on the rails. These guide rollers 6, such as detectors $d_1$ and $d_2$, may be positioned only at one end of the bridge, as is shown in this example.

Figure 2:
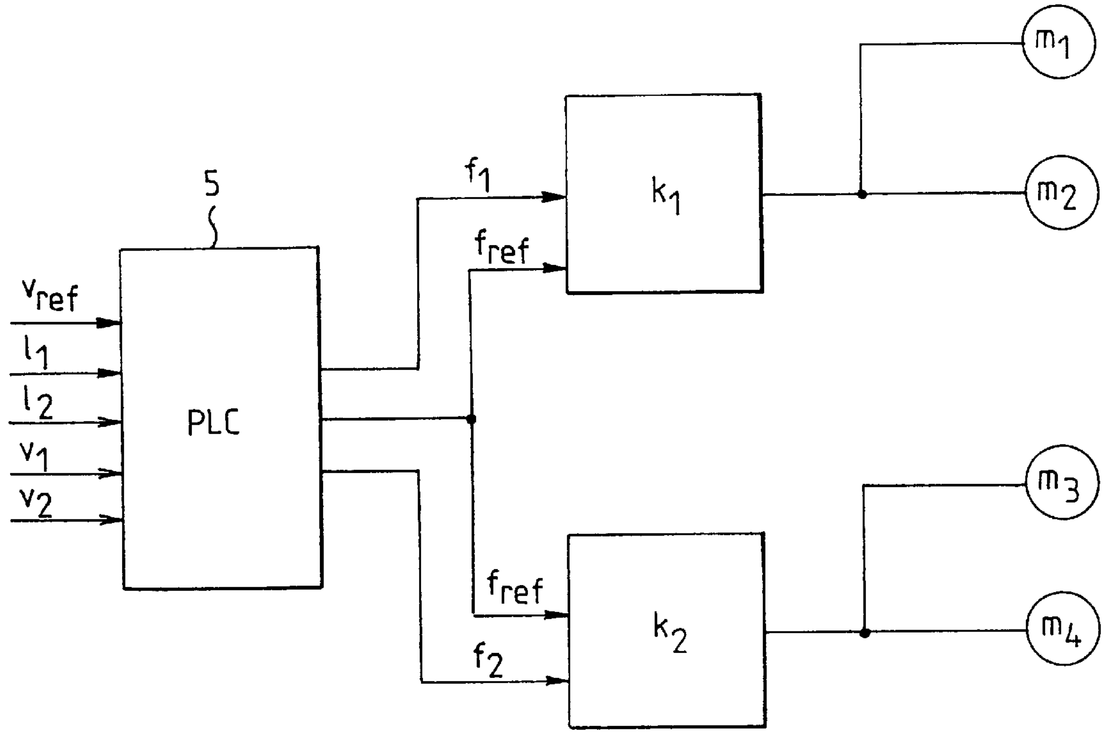
FIG. 2 shows a block diagram of the basic principle of even driving a crane bridge.

The principle of even driving the bridge 1 will not be described. The distance of the end of the bridge 1 provided with the guide rollers 6 from the rails 3 is measured with the two detectors $d_1$ and $d_2$ that can be inductive detectors, for example. On the basis of the obtained measurement information, the motor drives $k_1$ and $k_2$ of the bridge 1 are provided with a correction of speed direction. That is, the speeds of the motors $m_1$, $m_2$, $m_3$ and $m_4$ are corrected in such a manner that the end $e_1$ provided with the detectors $d_1$ and $d_2$ and thus the whole bridge will move straight and in the middle of the rails 3. This principle of even driving can be seen in the block diagram of FIG. 2. In FIG. 2:

$V_{ref}$= reference value of driving speed on bridge given by the user, $I_1$= distance measurement information given by the detector $d_1$, $I_2$= distance measurement information given by the detector $d_2$, $V_1$= the actual speed at the first end $e_1$, $V_2$= the actual speed at the first end $e_2$, $f_{ref}$= speed direction for the drives $k_1$ and $k_2$ (frequency direction in principle directly through the correction unit 5), $f_1$= correction signals for the drive $k_1$, and $f_2$= correction signals for the drive $k_2$.

Figure 3:
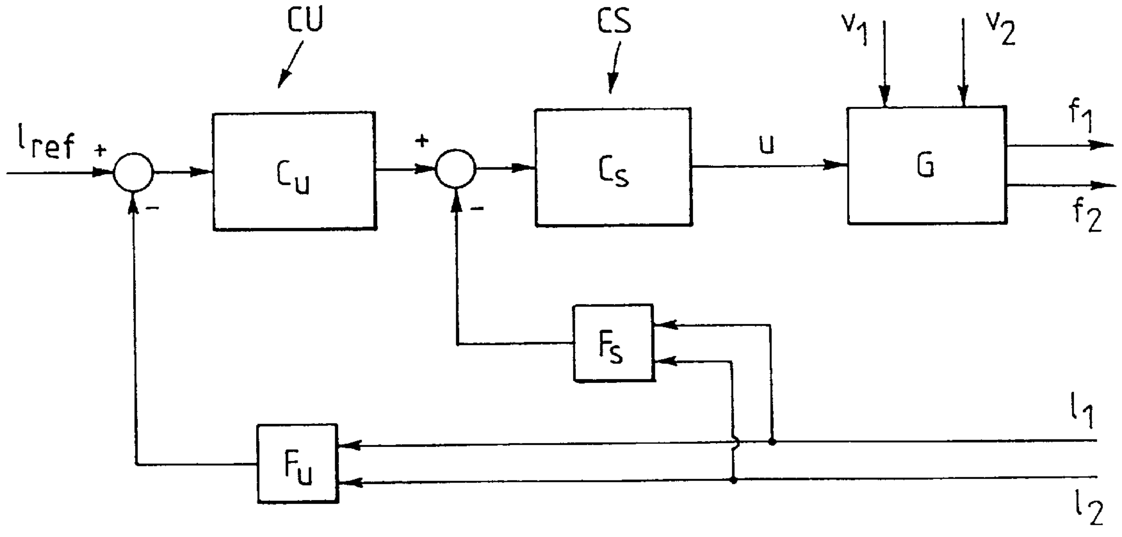
FIG. 3 shows a block diagram of the control system of the invention.

FIG. 3 shows the actual control system and its operation in block diagrams. This control system mainly comprises the correction unit 5 having an outer loop CU with its outer controllers $C_u$ and an inner control loop CS with its inner controllers $C_s$. The inner loop controller $C_s$ directs the difference of the distance measurement information $I_1$ and $I_2$ of the detectors $d_1$ and $d_2$ into a desired value. If only the inner loop controller $C_s$ is used, this means that the controller $C_s$ tries to drive each distance measurement information $I_1$ and $I_2$ into the same value. In other words, the bridge 1 tends to move straight on the basis of the measurements.

The difference of the distance measurement information $I_1$ and $I_2$ is calculated for the inner loop controller $C_s$ in block Fs. A scaling coefficient is preferably added to the calculation to make testing and implementation easier, in which case feedback for the inner loop controller $C_s$ is $r_1^*(I_1-I_2)$.

The inner loop controller $C_s$ cannot along drive the end $e_1$, $e_2$ of the bridge 1 to the middle of the rail 3, but the end $e_1$, $e_2$ is typically driven on guide rollers 6. In order for the end $e_1$, $e_2$ to remain in the middle of the rail 3, the system is supplemented by an outer loop CU whose controller $C_u$ directs the reference value of the inner loop controller $C_s$, trying to turn the bridge 1 in such a manner that the average of the distance measurement information $I_1$ and $I_2$ reaches the desired reference value $I_{ref}$.

The average of the distance measurement information $I_1$ and $I_2$ is calculated for the outer loop controller $C_u$ as a feedback signal in block $F_u$, in which case feedback for the outer loop controller $C_u$ is $0.5^*(I_1$, and $I_2)$. The outer loop controller $C_u$ thus tries to keep the average of the distance measurement information $I_1$ and $I_2$ at the reference value $I_{ref}$.

A fast controller $C_s$ should be used in the inner loop CS. It is advisable to choose P (Proportional) controller whose amplification is as high as possible, but low enough so that the controller will not vibrate. A slower controller $C_u$ should be used in the outer loop CU. If it is intended that in the balanced state the controller tries to remove a permanent control error, i.e., an integration term, a PI (Proportional Integral) controller should be used in addition to a P controller.

The output u of the control system can be used as such for the motor drives $k_1$ and $k_2$ of the bridge as a correction term in such a manner that the correction term will be subtracted from the speed direction of one of the ends $e_1$ and $e_2$ of the bridge 1 and correspondingly, the same term is added to the other speed direction. In other words, one end of the bridge 1 is accelerated while the other end is decelerated. The driving direction naturally has an effect on which end speed will be increased and on which will be decelerated.

Instead of conveying the correction term as such to the motor drives $k_1$ and $k_2$, it is often preferable to scale the correction term according to the actual drive speed $v_1$ and $v_2$ at the ends $e_1$ and $e_2$. In addition, it is in practice advantageous to filter the correction term to avoid torque strikes. These operations are carried out in block G. Scaling takes place so that on small driving speeds, the speed corrections of the ends $e_1$ and $e_2$ are small and when the driving speed increases, the speed corrections will correspondingly grow as well when necessary. One way is to scale the correction term linearly as a function of the actual driving speed. Another way is to tabulate scaling according to the driving speed.

In addition, it should be noted that the correction term must not pass through the ramp generator of the motor drive $k_1$ and $k_2$, but the correction term has to be associated with the speed direction that is conveyed to the speed controllers of the motor drive $k_1$ and $k_2$. If the correction is added before the ramp generator, the controller $C_s$ and $C_u$ will not have any effect during acceleration and deceleration.

The sign of the correction term conveyed to the motor drives $k_1$ and $k_2$ depends on the moving direction. When the driving direction of the bridge 1 changes, the sign of the correction term will also change. Similarly, the sign of the output of the outer loop CU depends on the driving direction of the bridge 1. The output of the outer loop CU, that is, the reference value of correction will change when the driving direction of the bridge 1 varies in such a manner that the controller $C_u$ tries to drive the bridge 1 in a difference way aslant when the driving direction changes so that the end $e_1$ and $e_2$ could be taken to the middle of the rail 3.

Because a reasonable speed is required of the inner loop controller $C_s$, measurements cannot be filtered too fast. Filtering which is too strong will make the controller $C_s$ vibrate. On the other hand, the outer loop controller $C_u$ filtered to be slower will tolerate more filtering of measurements. It may often be sensible to filter the measurements of the outer loop controller $C_u$ stronger than the measurements of the inner loop controller $C_s$, in which case the outer loop CU will act in a more unperturbed way.

Other controllers, such as a PI controller, can also be used as the inner loop controller $C_s$ in the place of a P controller. Similarly, the outer loop controller $C_u$ can be other than a PI controller. Furthermore, by changing the parameters of the control system, only the inner loop controller $C_s$ can be selected to be active, in which case the system tries to run the difference between the measurements to zero, as was said earlier. In exactly the same way by the selection of parameters, only the outer loop controller $C_u$ can be made active, whereby the control system tends to run the average of the measurements to the desired reference value irrespective of whether the bridge 1 will move straight. It depends on the application which of these alternatives will in practice produce the best result.

The explanation of the invention above is only intended to illustrate the invention. In its details, the invention may vary considerably in the scope of the accompanying claims. It should also be noted that the invention may be applied not only in connection with crane bridges but also in connection with other apparatuses driven on rails.

What is claimed is:

1. A system for directing an apparatus, such as a crane bridge, moving on wheels along rails, which apparatus comprises a specified drive arrangement on both sides of a roadway defined by rails, and which system comprises in the apparatus at least on one side of the roadway at least two successive detectors in a direction of the rail for measuring a lateral distance of a specific part of an edge of the apparatus to be driven from the rail, and a first, inner control loop guiding the drive arrangements, a controller of the loop being able to direct the distance measurements of the detectors to desired values so that the apparatus to be driven will move straight, wherein the system also comprises a second, outer control loop whose controller is able to direct a reference value of the controller of said first, inner control loop in such a manner that an average of the distance measurements provided by the detectors reaches a desired reference value so that the wheels of the apparatus to be driven will move in the middle of the rails.

2. A system according to claim 1, wherein both of the control loops are active.

3. A system according to claim 1, wherein one of the control loops is selected to be passive by changing suitably parameters of the system, in which case when the inner loop is active, the system tries to run a difference between the measurements to zero, and when the outer loop is active, the system tries to run the average of the measurements to the desired reference value.

4. A system according to claim 1, wherein the inner loop controller is faster than the outer loop controller.

5. A system according to claim 1, wherein the controllers include at least one of a P controller and a PI controller.

6. A system according to claim 1, wherein the system further comprises a scaling block for scaling a speed correction term given for the drive arrangements in accordance with an actual driving speed, whereby corrections are small on low driving speeds and greater on higher driving speeds.

7. A system for driving an apparatus along rails comprising:

detecting means for detecting distance measurements with respect to an edge of the apparatus and at least one rail;

first control means for directing the distance measurements to a desired value so that the apparatus is driven in a straight direction along the rails; and second control means for directing a reference value of said first control means to a desired reference value to turn the apparatus so that ends of the apparatus are positioned in the middle of the rails.

8. A system according to claim 7, said second control means directing the reference value of said first control means so that an average of the distance measurements reaches the desired reference value.

9. A system according to claim 7, said first and second control means being selected to be active.

10. A system according to claim 7, wherein when said first control means is selected to be active and said second control means is selected to be passive, the system directs a difference between the distance measurements to zero; and when said first control means is selected to be passive and said second control means is selected to be active, the system directs an average of the distance measurements to the desired reference value.

11. A system according to claim 7, wherein said first control means is faster than said second control means.

12. A system according to claim 7, wherein one end of the apparatus is accelerated and one end of the apparatus is decelerated.

13. A system according to claim 7, wherein at least one of said control means outputs a correction term for adjusting speed of the ends of the apparatus.

14. A system according to claim 13, wherein the correction term is scaled.

15. A system according to claim 13, wherein the correction term is filtered.

16. A system according to claim 14, wherein the correction term is scaled in accordance with an actual driving speed of the ends of the apparatus, so that corrections are small on low driving speeds and are greater on higher driving speeds.

* * * * *